United States Patent Office 3,568,225
Patented Mar. 9, 1971

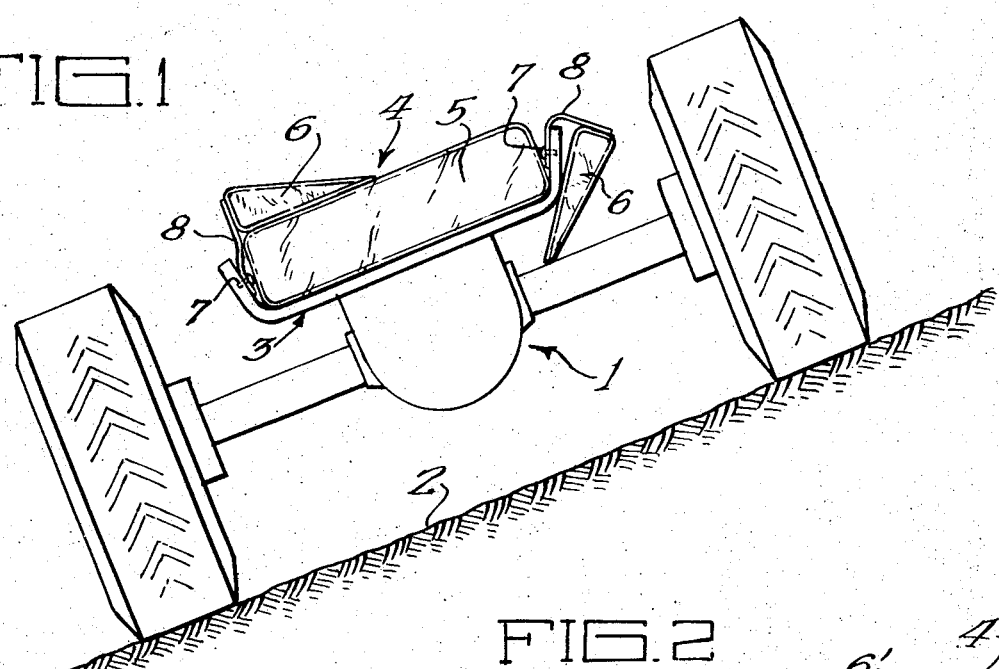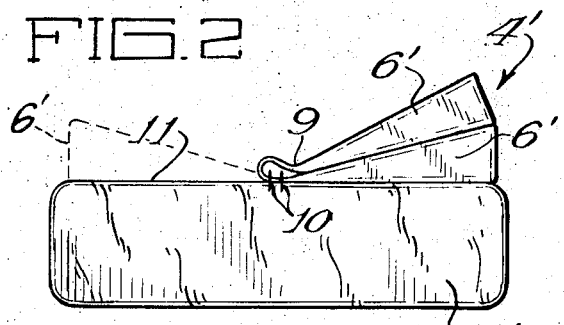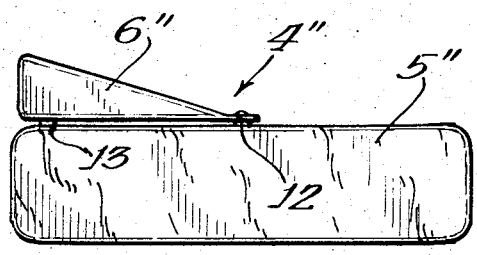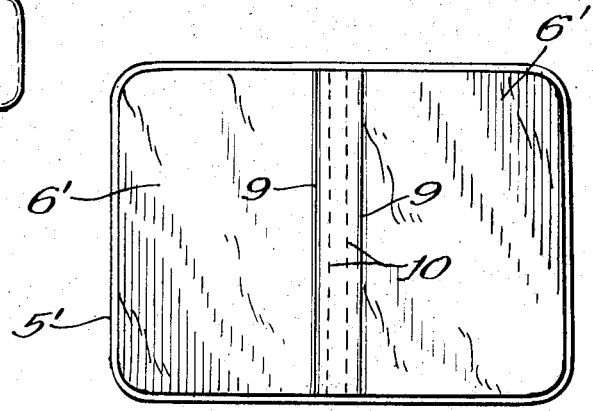

3,568,225
VEHICLE CUSHION HAVING POSITIONABLE BOLSTER CUSHIONS
Arthur O. Radke, Milwaukee, Wis., assignor to Universal Oil Products Company, Des Plaines, Ill.
Filed Nov. 29, 1968, Ser. No. 780,109
Int. Cl. A47c 27/22, 27/02
U.S. Cl. 5—357
9 Claims

ABSTRACT OF THE DISCLOSURE

A vehicle seat cushion having a main cushion and bolster cushions swingably positionable against said main cushion, in order to vary the contour of the vehicle cushion to allow a more comfortable ride in a vehicle traveling transversely across a sloping surface.

---

This invention relates to a vehicle cushion having a main cushion and bolster cushions swingably positionable against said main cushion in order to vary the contour of the exposed surface of said vehicle cushion. More particularly, the bolster cushions may be attached to said main cushion along a linear axis on an exposed face of said main cushion, or they may be attached to another portion of the vehicle and swung into position against the main cushion as desired.

In a number of situations, vehicles, particularly tractors and earth moving vehicles, are used to travel transversely across sloping surfaces for prolonged periods of time. Such a continued period of vehicle travel invariably results in increased fatigue and discomfort on the part of the vehicle operator if the operator is seated on a conventional seat cushion or resting on a conventional back rest cushion. This fatigue and discomfort results from the continued strain of the vehicle operator in maintaining his body in an upright position when the vehicle remains tipped laterally to one side or the other. The vehicle operator must either support himself with one hand, thus depriving himself of a substantial degree of control over the vehicle, or he must twist his body from the direction of tipping to an upright position to keep the gravitational forces which act on his body from causing him to fall over. This preoccupation by the vehicle operator in maintaining his equilibrium, and the fatigue resulting therefrom, present a hazard both to the safety of the vehicle operator and to other persons and property in the immediate vicinity.

There are a variety of situations in which vehicles travel transversely across sloping surfaces for prolonged periods of time. Some common uses in which these situations occur are where tractors are used to plow hillsides and cut weeds and grass on the grade of a highway, where road graders are used to create a highway grade, and where backhoes are used to dig trenches across hillsides.

It is a primary object of this invention to provide a vehicle cushion which reduces operator fatigue and discomfort in operating a vehicle transversely across a sloping surface. It is a further object of this invention to reduce the lack of control and the hazard to the safety of the operator and others which occurs as a direct result of such fatigue and discomfort.

Another object of this invention is to provide a cushion which is easily adaptable to promote operator comfort in a vehicle traveling transversely across a sloping surface, traveling uphill or downhill, or traveling across a relatively level surface.

In a broad aspect this invention is a vehicle cushion comprising a main cushion and bolster cushions swingably positionable against said main cushion. Both the main cushions and the bolster cushions may be constructed in any conventional form and manner. These cushions may be filled with foam, air, or any other cushioning means. They may or may not have a solid pan support, a separate cushion cover, and internal springs. In addition, these cushions may be, but are not necessarily, attached to the vehicle.

In a preferred embodiment each bolster cushion is swingably attached to said main cushion at a linear axis on an exposed face of said main cushion. The bolster cushions are normally attached to the exposed face upon which or against which the vehicle operator rests, but may be attached to the side surfaces of the main cushion, or any portions thereof not in contact with any other part of the vehicle. In one form of construction, the bolster cushions may each be attached to an edge of the main cushion which bounds the surface of the cushion upon which or against which the vehicle operator rests. On the other hand, the bolster cushions may be attached to the main cushion at a line running down the center of the main cushion from front to rear in the direction of vehicle movement. Where the main cushion is both square and removable from the seat frame, such a cushion may be turned so that the bolster cushions are attached to the main cushion at a line substantially perpendicular to the direction of vehicle movement. Such a positioning would be advantageous where prolonged uphill or downhill movement of the vehicle is undertaken.

In a preferred embodiment of this invention, the bolster cushions are wedge shaped and are attached to the main cushion at their apexes. The wedge shape provides for a gradual change in slope from one side of the vehicle cushion to the other, thereby avoiding any bump causing discomfort at the junction of the bolster cushions with the main cushion. Where there are two, four, or any even number of bolster cushions, and the bolster cushions are all attached to the main cushion along a line at the center of the main cushion from front to rear of the main cushion in the direction of vehicle motion, half of the bolster cushions may be swung against one side of the main cushion, and the other half of the bolster cushions may be swung against the other side of the main cushion. This will cause the sides of the vehicle cushion to be raised with respect to the center of the vehicle cushion and will result in an individual sitting on the vehicle cushion or leaning against the vehicle cushion to be centered with respect to the vehicle cushion when the vehicle is traveling over level terrain. For traveling transversely across a sloping surface, some of the bolster cushions on the side opposite the side of the vehicle which is tipped may be swung over to the side which is tipped. This will tend to create a more level surface upon which the vehicle operator sits. When the vehicle reverses direction and travels back over the sloping surface, or when the direction of tipping otherwise reverses, the bolster cushions need merely be swung to the opposite side of the main cushion to compensate for this reversed direction of tipping.

In another embodiment the bolster cushions are removably attached to the main cushion. In this arrangement a bolster cushion may be swung from one side of the main cushion to the other, depending upon which way the vehicle is tipped. When the vehicle is operated upon substantially level ground, the bolster cushion may be detached completely from the main cushion. One manner of detachable attachment which allows this swinging motion is a construction of the bolster cushion with a strip of flexible material, possibly the same material as a bolster cushion cover, in which are fixed the protruding portions of conventional friction snaps. The indented mating or receiving portions of these snaps are in the main cushion. The two parts of the friction snaps are forced together, and the bolster cushion may be swung to either side of the main cushion by the flexible strip. Instead of mating portions of friction-held snaps being fixed with one portion in the bolster cushion and the other portion in the main cushion, other removable fastening or attaching means may be used. Such other removable means include buttons, zippers, buckles, and so on.

Still another embodiment of this invention is an arrangement where the bolster cushions are swingably attached to the vehicle in which they are used. In this instance, the bolster cushions may be attached to a seat frame, a seat pan, or other vehicle part by a flexible strip of material, such as the cover material. The attachment to the vehicle may be by any conventional detachable or permanent fastening means. In this embodiment the bolster cushions are not positioned on the main cushion when the vehicle travels over substantially level ground. When the vehicle is to be used to travel transversely across a slope, the appropriate bolster cushion may be swung up and positioned in place. The bolster cushion may either be removably attached to the main cushion, as heretofore described, to hold the bolster cushion in place during the time it is in contact with the main cushion, or it may merely rest on the main cushion without attachment.

In any embodiment, additional friction snaps, ties, zippers, or other detachable fastening means may be used to secure the outside edges of the bolster cushions in the desired positions against the outsides of the main cushions. In most instances this invention is applied to a vehicle seat cushion though it can be applied to a backrest cushion, a footrest cushion, or a headrest cushion. It is these latter applications in which additional fastening means are most appropriate.

This invention is further illustrated in the accompanying drawings in which:

FIG. 1 is an elevational view of a vehicle equipped with this invention traveling transversely acrosss a sloping surface.

FIG. 2 is an elevational view of a preferred embodiment of this invention.

FIG. 3 is a plan view of the preferred embodiment of FIG. 2.

FIG. 4 is an elevational view of another embodiment of this invention.

Referring now to FIG. 1, there is shown a tractor 1 traveling transversely acrosss a sloping surface 2. Tractor 1 is equipped with a seat frame 3 in which is encased a vehicle cushion 4. Vehicle cushion 4 is comprised of a main cushion 5 and bolster cushions 6. Bolster cushions 6 are each secured to opposite sides of seat frame 3 by screws 7 through reinforced holes in strips of material 8. Strips 8 are merely extensions of the fabric covering bolster cushions 6. As illustrated, the tractor is tipped toward the left. To compensate for this, the bolster cushion 6 on the lefthand side of the tractor is swung up on top of the lefthand side of the main cushion 5 in order to give the tractor operator a more nearly level ride. The righthand bolster cushion 6 is allowed to hang idle from the righthand side of seat frame 3.

Another embodiment of this invention is illustrated in FIG. 2. A vehicle cushion 4' is comprised of a main cushion 5', and bolster cushions 6' swingably positionable against main cushion 5'. Bolster cushions 6' are swingably attached to main cushion 5' at a linear axis 10 on the exposed face 11 of main cushion 5'. Bolster cushions 6' are wedge shaped and are attached to main cushion 5' at their apexes 9. In FIG. 2 both bolster cushions 6' are shown as swung to the righthand side and positioned against main cushion 5'. This would be the position of the bolster cushions 6' if the vehicle in which vehicle cushion 4' was used were to travel transversely across a sloping surface which slopes up to the left and down to the right. For riding in a substantially level position, the top bolster cushion 6' is swung over to the lefthand side of main cushion 5', as indicated by the dashed lines in FIG. 2 and by the view of FIG. 3.

FIG. 3 is a plan view of the vehicle cushion 4' of FIG. 2 in which the bolster cushions 6' are arranged for level traveling over a level surface. In FIG. 3 it can be seen that bolster cushions 6' comprise the two ends of a single structure which is sewn to main cushion 5' at the center of both main cushion 5' and the aforesaid single structure. This sewing results in seam 10, which is the linear axis about which cushions 6' are swung.

FIG. 4 illustrated a slightly different embodiment of the vehicle cushion of this invention. In FIG. 4, bolster cushion 6'' is removably attached to main cushion 5'' by snaps 12, which are spaced along a linear axis perpendicular to this view. Snaps 12 swingably fasten the inside of bolster cushion 6'' to main cushion 5''. The protruding portions of snaps 12 extend from bolster cushion 6'' and are received by the mating portion of snaps 12 which are fixed in cushion 5''. Snaps 13 are constructed and spaced similar to snaps 12. Snaps 13 are used to detachably secure bolster cushion 6'' in the desired position against main cushion 5''.

The embodiments illustrated in the attached drawings should not be considered as limiting this invention thereto. The inventive concept disclosed herein involves auxiliary or bolster cushions which are readily swingable with respect to a main cushion to vary the surface contour of a vehicle cushion. The main cushion and fastening means may be of any conventional or appropriate design or construction. The bolster cushions likewise may be constructed as any conventional or appropriate cushion or pillow.

What I claim is:

1. In combination with a tractor or similar vehicle, a seat unit for the operator of said vehicle which comprises a main cushion having an upper exposed face and opposing side surfaces; means to support said main cushion connecting with the vehicle; at least first and second opposing wedge-shaped bolster cushions which are independently swingably positionable against said upper exposed face, each of said bolster cushions having a thick side and an apex-like edge, the bolster cushions being arranged such that, when both are positioned against the upper face of said main cushion, said apex edges are adjacent and fall on a central axis which is approximately equidistant from the opposing side surfaces of said main cushion and is either parallel to or perpendicular to the direction of vehicle movement; means swingably attaching each of said bolster cushions to one of said main cushion and said main cushion support means whereby, when the vehicle is traveling over non-level terrain such that the upper face of said main cushion is inclined to the horizontal, either the first or the second bolster cushion may be selectively swung into position against the upper face of said main cushion and the surface contour of said seat unit may be thereby varied to more nearly approximate a horizontal seating surface.

2. The seat unit of claim 1 further characterized in that each bolster cushion is swingably attached to said main cushion at a linear axis on the upper exposed face of said main cushion.

3. The seat unit of claim 2 further characterized in that said bolster cushions are attached to said main cushion at their apexes.

4. The seat unit of claim 3 further characterized in that said bolster cushions further comprise the two ends of a single structure which is sewn to said main cushion at the center of both said main cushion and the aforesaid single structure.

5. The seat unit of claim 2 further characterized in that said bolster cushions are removably attached to said main cushion.

6. The seat unit of claim 1 further characterized in that said central axis is parallel to the direction of vehicle movement.

7. The seat unit of claim 1 further characterized in that said central axis is perpendicular to the direction of vehicle movement.

8. The seat unit of claim 1 further characterized in that said bolster cushions are swingably attached to said main cushion support means.

9. The seat unit of claim 8 further characterized in that said swingable attaching means comprises a strip of flexible material connecting the thick side of its respective bolster cushion with said main cushion support means, whereby each bolster cushion may be independently swung completely clear of the main cushion and allowed to hang from one side of the seat unit.

References Cited

UNITED STATES PATENTS

| | | | |
|---|---|---|---|
| 2,727,562 | 12/1955 | Glascock | 248—371 |
| 3,220,770 | 11/1965 | Schaeffer | 297—391X |
| 3,319,269 | 5/1967 | Maddox | 297—391X |
| 3,346,298 | 10/1967 | Champion | 297—382X |
| 3,360,806 | 1/1968 | Dunaway | 5—352X |

FOREIGN PATENTS

| | | | |
|---|---|---|---|
| 58,180 | 10/1911 | Switzerland | 5—357 |
| 778,039 | 2/1968 | Canada | 5—352 |

CASMIR A. NUNBERG, Primary Examiner

U.S. Cl. X.R.

5—352; 297—454